G. W. N. YOST.
Cultivator.
3 Sheets—Sheet 1.
No. 29,849.
Patented Aug. 28, 1860.
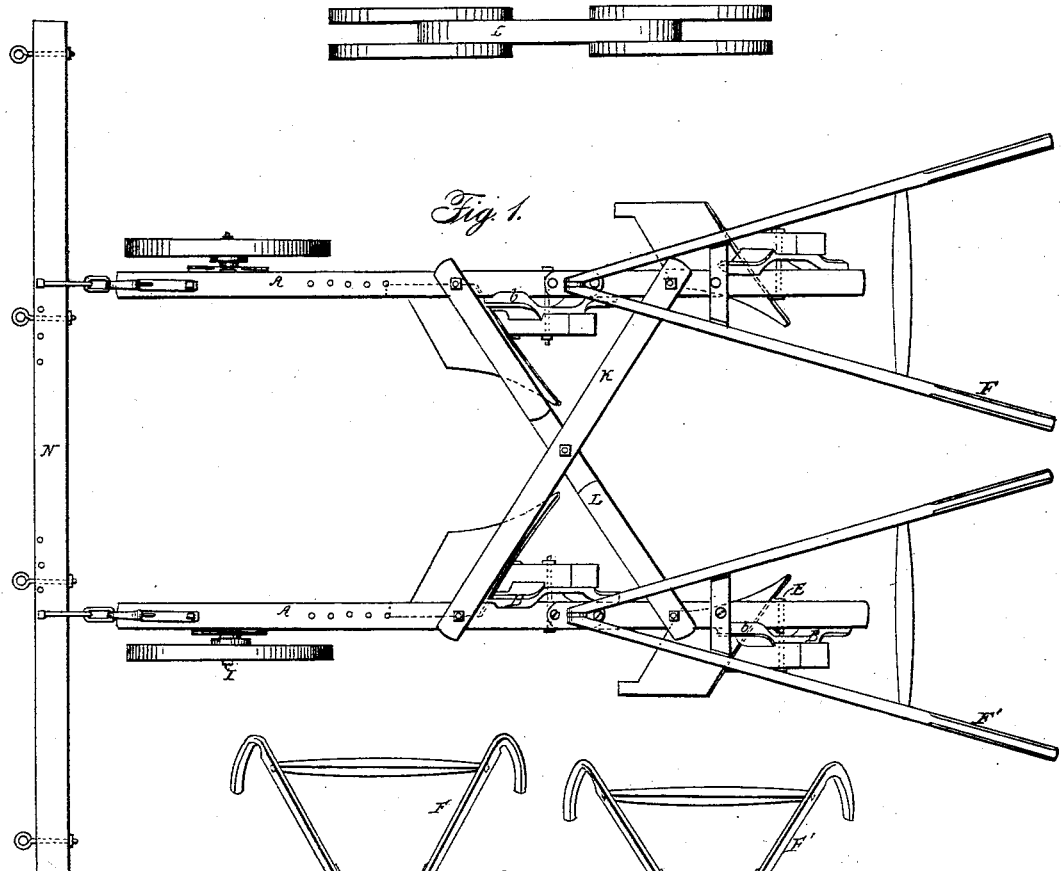
Witnesses:
Inventor:

G. W. N. YOST.
Cultivator.
No. 29,849.
3 Sheets—Sheet 2.
Patented Aug. 28, 1860.
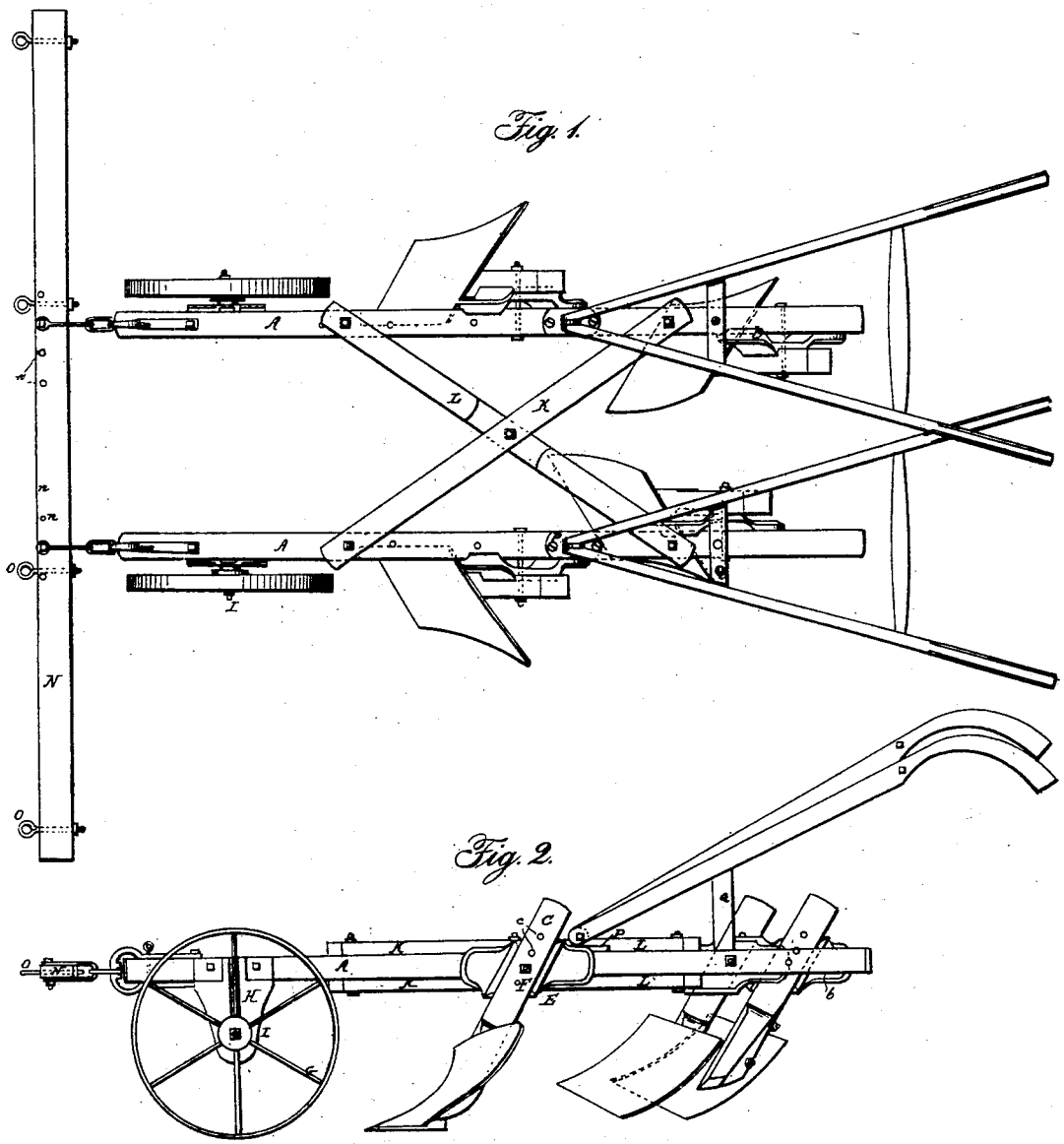
Witnesses:
Inventor:

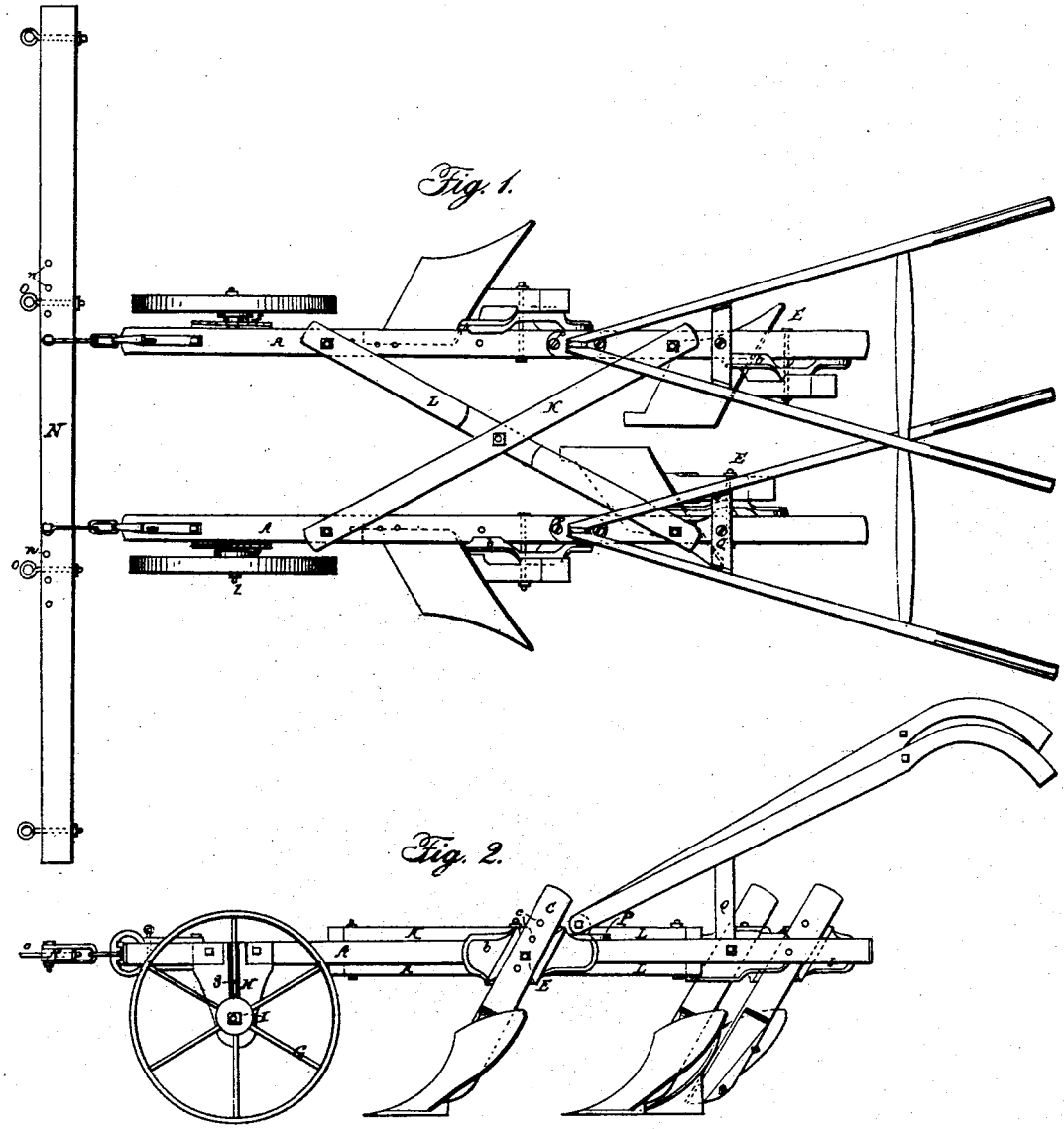

UNITED STATES PATENT OFFICE.

G. W. N. YOST, OF YELLOW SPRINGS, OHIO, ASSIGNOR TO HIMSELF AND JOHN F. WATSON, OF EDWARD'S DEPOT, MISSISSIPPI.

IMPROVEMENT IN CULTIVATORS.

Specification forming part of Letters Patent No. 29,849, dated August 28, 1860.

*To all whom it may concern:*

Be it known that I, GEO. W. N. YOST, of Yellow Springs, in the county of Greene and State of Ohio, have invented a new and useful Improvement in Cotton-Plows; and I do hereby declare that the following is a full and exact description thereof, reference being had to the accompanying drawings, and to the letters of reference marked thereon.

From the middle of April until the first of July (during the season of cultivating young cotton) is one of the most busy and important seasons of the whole year to the young cotton planter. During this part of the year it is of the first importance to save the labor of the plantation hands.

The object of my invention is to save labor during this busy part of the year, and as there are different operations to be performed; also, to modify my machine so as to be able to adapt it to barring off and scraping both sides of the row at once; also, to hilling both sides of the row at the same time with two furrows on each side; also for cultivating the whole middle of the row at once.

For the sake of complete illustration, I have shown the several modifications of my plow on three separate sheets of drawings.

Sheet 1 represents my plow arranged for hilling young cotton. Sheet 2 shows the plow arranged for barring off and scraping both sides of the row at once. Sheet 3 exhibits the plow as arranged for breaking out middles.

In Sheet No. 1 of the accompanying drawings, Figure 1 is a top view of my machine for hilling cotton. Fig. 2 is a front view of the same. Fig. 3 is a side view of one of the cross-braces connecting the two beams, seen also in Fig. 1 same sheet.

This plow, Fig. 1, Sheet 1, is very simple in its construction. The two beams A may consist of straight bars having neither mortise nor tenon. To the sides of these beams are bolted sockets B, provided with jaws for receiving the standards C, which carry the plows D. These sockets B are cast with lips *b* to prevent their turning on the beams A in plowing, and both the sockets B and the standards C are secured by a single bolt, E. It will be observed that but little labor or expense is required in fitting these parts, and no risk of the joints working loose, as the whole can be tightened by the nut upon bolt E. The handles are also attached to beam A in a very simple manner by plates P and braces Q. (Better seen in Fig. 2, Sheet 2.)

The plows D may be attached to the standards C in any suitable manner, as seen in Fig. 2, Sheet 2, and these standards are made adjustable upon the beam A by means of several holes, *c*, for the bolt E.

Upon beams A are arranged wheels G, secured in place by plates H, and provided with short independent journals I. These wheels are made adjustable vertically in slots of plate H in order to regulate the depth of plowing.

The two beams A are connected by two cross-braces, K and L. These braces are bolted together at their centers, and their ends are bolted to the beams A, as seen in Fig. 1, Sheets 1 and 2. By means of these braces the two beams can be set farther apart or nearer together at pleasure, there being several holes, M, in the beams A for securing the forward ends of the braces. In Fig. 1, Sheet 1, the beams are set far apart; but in Fig. 1, Sheet 2, they are brought nearer together. The braces K and L not only adjust and brace the beams A laterally, but they also brace them vertically, binding the whole machine together in such manner that it will run like a harrow without any person having hold the handles, performing good work by simply guiding the team.

In Sheet 1 it will be observed that the four plows are employed to turn the furrows together for the purpose of hilling young cotton. These plows are all of similar construction and do similar work, only two are right and two are left handed, thus hilling both sides of the row at once. In this operation the beams must be set apart sufficiently to prevent the two middle furrows from covering up the young plant.

In Sheet 2 the forward plows are the same as in Sheet 1; but in the rear are two cotton-scrapers, the whole so arranged as to bar off and scrape both sides of the row at once.

In Sheet 3 is shown a different arrangement of the same machine, the plows all being placed so as to turn two furrows from the center—just the opposite of the action of the machine as shown in Sheet 1. Here the two beams are brought close together, and so arranged that the plows will completely cultivate the middle of the row.

I am aware that the beams of gang-plows have been made adjustable. Therefore I do not broadly claim adjusting the beams of gang-plows, but limit myself to the peculiar machinery above described.

Having thus fully described my invention, what I claim as new, and desire to secure by Letters Patent, is—

The arrangement and combination of the two beams A, cross-braces K and L, movable shares D, and wheels G, the whole being constructed as and for the purposes herein described.

G. W. N. YOST. [L. S.]

Witnesses:
DANIEL BREED,
EDM. F. BROWN.